United States Patent
Riff

[15] 3,673,489
[45] June 27, 1972

[54] ALTERNATOR AND REGULATOR CONTROL SYSTEM

[72] Inventor: James A. Riff, Chicago, Ill.
[73] Assignee: Motorola, Inc., Franklin Park, Ill.
[22] Filed: Aug. 5, 1971
[21] Appl. No.: 169,431

[52] U.S. Cl.................................322/28, 322/33, 322/73, 322/75, 322/91, 322/99
[51] Int. Cl.................................................H02p 9/30
[58] Field of Search....................322/28, 33, 59, 60, 73, 75, 322/91, 95, 99

[56] References Cited

UNITED STATES PATENTS

| | | | |
|---|---|---|---|
| 3,260,917 | 7/1966 | Shimwell et al. | 322/91 UX |
| 3,299,342 | 1/1967 | Rath | 322/75 X |
| 3,544,881 | 12/1970 | Raver et al. | 322/28 X |

Primary Examiner—Lewis H. Myers
Assistant Examiner—H. Huberfeld

[57] ABSTRACT

An alternator and regulator control system includes diodes connected to the output windings of the alternator to pass unidirectional current pulses and to cause blocking of current when voltage in the output winding reverse biases the diodes. This blockage of current produces a high reverse voltage pulse in the output winding which is then delivered to the field winding of the alternator through electronic switch means to cause excitation of the alternator to develop high power output in the stator windings of the alternator. The electronic switch is a thyristor and forms part of a feedback circuit which is controlled by a voltage regulator that controls the output voltage of the alternator.

9 Claims, 5 Drawing Figures

INVENTOR
JAMES A. RIFF
BY Mueller & Aichele
ATTORNEYS

INVENTOR.
JAMES A. RIFF
BY Mueller & Aichele
ATTORNEYS.

ALTERNATOR AND REGULATOR CONTROL SYSTEM

BACKGROUND OF THE INVENTION

This invention relates generally to dynamoelectric machines and more particularly to an alternator and regulator control circuit of the type used in automotive electrical systems.

Alternators used in the electrical charging systems of automobiles are well known in the art and have always been considered a very efficient machine for charging the automobile battery and operating various electrical equipment as compared to the old DC generator type of system. The alternator produces an alternating current voltage at the output thereof which is rectified through a plurality of diodes, generally in a full wave configuration, to provide the necessary DC voltage to the electrical components and battery charging system of the automobile. The alternator system is considered superior to the DC generator in that charging current is obtained even when the engine is running at slow speed. Although the alternator charging system is considered relatively efficient, it has nevertheless some energy losses as a result of rapid turn off of diode rectifiers at the output. The rapid turn off the diodes causes a high reverse voltage pulse to be developed at the output winding of the alternator as a result of the reduced current in the reverse direction of the diodes.

In the prior art the rotating field of the alternator is excited by a DC current from the battery or alternator output, which is generally controlled by means of a voltage regulator. While this is a relatively common and straight forward method of exciting the rotating field of the alternator it requires external power to initiate start up operation of the alternator because of the relatively low levels of residual magnetism retained in the alternator components. This can be overcome by initially operating the alternator at high speeds. However, in some cases in the prior art small permanent magnets are put into the alternator to provide the magnetic field necessary for self start up of the alternator. Also, the power output level of prior art alternators is substantially constant over a given range of engine speed and load. For example, a typical output may be about 40 amperes when the field is excited by the battery source and with an armature speed of between about 2,000 and 8,000 rpm. This example is with a full wave rectifier arrangement at the output of the alternator. However, if the output is provided with a half wave rectifier arrangement, the output of the alternator will be increased at the higher rpm's but reduced at the lower rpm's. In any event, because of the field being fed by the battery or charging supply, the power output of the alternator is substantially limited for a given machine design and construction.

SUMMARY OF THE INVENTION

Accordingly, it is an object of this invention to provide an improved alternator and regulator control system that will produce much more power output from the alternator for a given machine design and construction than can be presently obtained by conventional methods.

Yet another object of this invention is to provide an alternator and regulator control system wherein the excitation for the field is obtained by the reverse voltage pulses which occur upon turnoff of the output diodes of the alternator system.

Still another object of this invention is to provide an improved alternator and regulator control system which allows an alternator to operate more efficiently by utilizing the reverse voltage pulses generated inherently in the machine to energize the rotating field thereof.

Briefly, the alternator and regulator control system includes the output windings of an alternator structure which are connected in WYE configuration. The field winding of the alternator is arranged to receive pulses of direct current to develop a magnetic field which, in turn, generates the output of the alternator. The pulses of direct current are converted either through a full wave bridge rectifier or half wave rectifier through a thyristor such as silicon controlled rectifier or other device in response to a switching circuit which controls the passage of high reverse voltage pulses developed as a result of rapid turn off of the output diodes. This high reverse voltage condition occurs each time current ceases to flow through a given output winding by reverse biasing of the associated diode. The feedback of the high reverse voltage pulses to the field winding is obtained through a switching circuit controlled in response to a voltage regulator. The high reverse voltage pulses are many times greater in voltage value than is obtained by the battery charging system at the alternator output that it induced a much higher voltage into the rotating field. This increased voltage, which is obtained from within the alternator itself, will greatly increase the output of the alternator far beyond that which can be obtained by present conventional methods. The switching circuit which may form part of the voltage regulator will operate in the conventional manner but will switch the high reverse voltage pulses rather than the conventional battery voltage. For example, when the switching circuit is in the open condition, no feedback of high reverse voltage pulses occurs and the output of the alternator is reduced. On the other hand, upon sensing a demand for more power the switching circuit is closed, by energization of an electronic switching device, to provide a current path for the reverse voltage pulses. One very significant advantage of the present invention is that the increased power which is obtained is at the higher rpm's of the rotor which, because of an associated fan, will produce sufficient cooling air to flow over the alternator housing and cool the same.

DESCRIPTION OF THE ILLUSTRATES EMBODIMENTS

Figure 1:
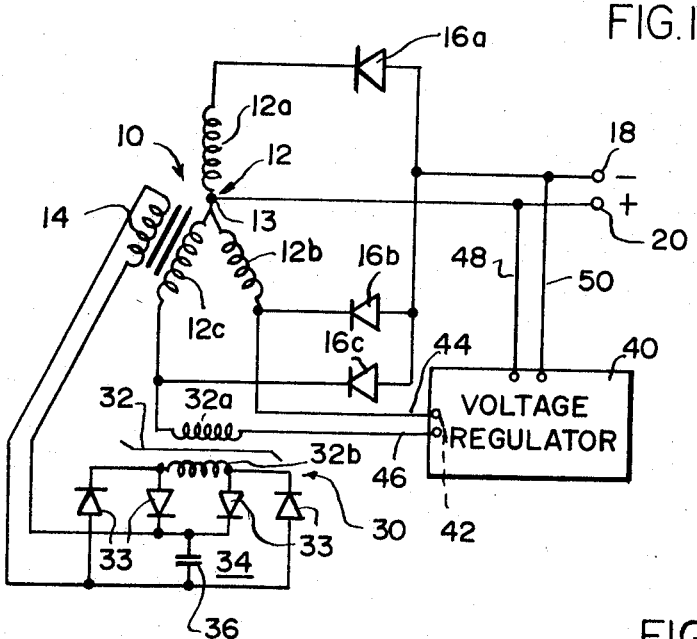
FIG. 1 is a schematic diagram of one form of alternator and regulator control system of this invention wherein a rotary transformer is associated with the alternator.

Referring now to FIG. 1 there is seen an alternator and regulator control system designated generally by reference numeral 10. The alternator is illustrated as having an output winding 12, which is generally the stator of the alternator, and a rotating field winding 14. The field winding 14 is energized to provide a magnetic field which, in turn, induces an alternating current voltage in the output windings 12. In the illustrated embodiment, the output windings 12 are connected in WYE configuration with windings 12a, 12b and 12c connected together at a common circuit point 13 which, in turn, is here illustrated at the positive output terminal of the system.

Output diodes 16a, 16b and 16c are connected to the windings 12a, 12b and 12c, respectively, to rectify the alternating current voltage induced in these windings to produce a direct current voltage across the output terminals 18 and 20. It will be noted that this is three phase half wave rectification where only three diodes are used rather than the usual six diode full wave configuration. When the cathode electrodes of diodes 16a, 16b and 16c are negative the alternating current voltage is delivered to terminals 18 and 20 in the form of pulsating DC. However, at the end of each negative half cycle, the diodes are instantly rendered nonconductive in the usual manner. This rapid nonconduction of the diodes causes a reverse voltage condition to exist in the stator windings 12a, 12b and 12c in successive sequence in accordance with their sequence of energization. Heretofore, this reverse voltage pulse or kickback voltage was dissipated within the system and this energy was lost. In accordance with the general concepts of this invention, these reverse voltage pulses are fed back to the field winding 14 to energize the alternator system.

Figure 3:
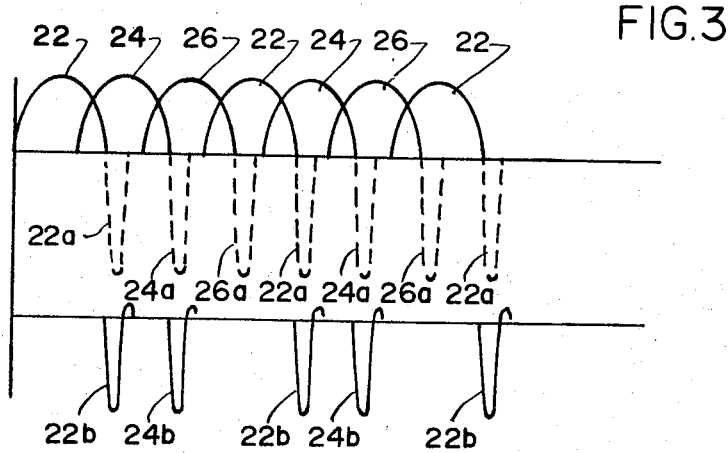
FIG. 3 is a series of waveforms which represent the output of the alternator and regulator control system of FIG. 1.

For a better understanding of the operation of the alternator and regulator control system of FIG. 1, reference is now made to FIG. 3 which illustrates the half wave pulses 22 which occur at the output of winding 12b, and the half wave pulses 24 which occur at the output winding 12c. Half wave pulses 26 which occur at the output winding 12a are also illustrated, but the reverse voltage pulses that are produced by these pulses are not used for field excitation. At the bottom of each pulse, a broken line indicates the high voltage short time duration reverse voltage kickback pulse 22a, 24a and 26a for the associated pulses 22, 24 and 26, respectively. Pulses 22b and 24b correspond to the reverse voltage pulses and are delivered to a rotary transformer 32 at each end thereof from windings 12b and 12c in time relation so that current passes alternately in one direction and then in the other direction through the primary winding 32a. Also, since the reverse pulses are obtained from across two windings 12b and 12c the net voltage is twice that otherwise obtained and the small amount of residual magnetism remaining in the system is then sufficient to initiate operation of the alternator.

The primary winding 32a is connected to a voltage regulator 40 to have the circuit thereof open and close in response to a switching mechanism indicated by 42 connected between the lines 44 and 46. When the switch 42 is open, no current passes through the primary winding 32a and no pulses are transformer coupled across the rotary transformer 32. However, upon sensing the output voltage at terminals 18 and 20, this being accomplished over lines 48 and 50, switch 42 closes and pulses of current then pass through the primary winding. Pulses of current which are transformer coupled into the rotary secondary winding 32b are rectified to produce a DC voltage by a plurality of diodes 33 which form the bridge rectifier circuit 34. The output of the bridge circuit 34 is filtered by a capacitor 36 and applied to the field winding 14 as a DC or a pulsating DC current. The rotary secondary winding 32b, the bridge circuit 34, and capacitor 36 and field winding 14 are all mounted on a common shaft for rotation therewith thus eliminating the need for brushes or other mechanical connections to the field winding.

The voltage regulator 40 may take any convenient form, which will sense variations in output voltage across terminals 18 and 20 and operatively energize and de-energize the switching device 42. The switching device 42 may be any relatively fast acting electronically or electrically controlled switching device.

Figure 2:
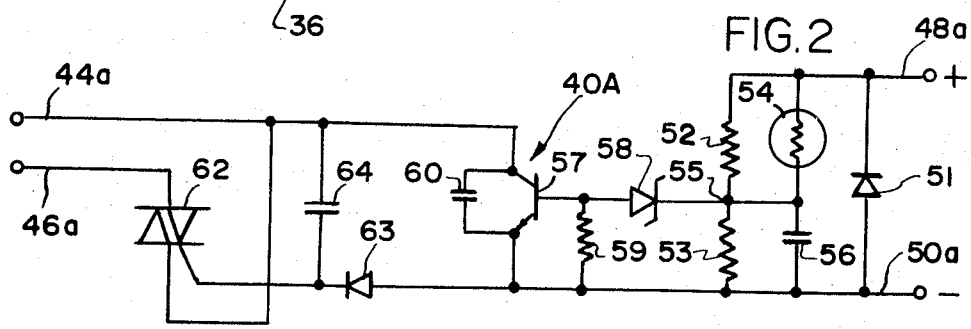
FIG. 2 is a voltage regulator which can be used in the circuit of FIG. 1.

Referring now to FIG. 2, a voltage regulator switching circuit 40A illustrates one such form of voltage regulator which can be used in the circuit of FIG. 1. The regulator 40A has input lines 48a and 50a corresponding to lines 48 and 50 of FIG. 1 for receiving the energizing voltage. A reverse bias protection diode 51 is connected across these lines and a voltage divider network including resistors 52 and 53 together with a thermistor 54 and capacitor 56 form the basic temperature compensation network for the regulator circuit. Variations in ambient temperature are thus compensated by changes in resistance value of the thermistor 54. The center tap 55 of the voltage divider network is then applied to the base electrode of a transistor 57 through a zener diode 58 which provides a reference voltage for regulation. A control current is developed across a biasing resistor 59 between the base and emitter electrodes of transistor 56 while the collector emitter electrodes are shunted by a capacitor 60 which absorbs any spikes or increased voltage transients that occur in the circuit. The output of transistor 57 is connected to the gate electrode of a triac 62 through a diode 63. Although a trial is shown in this embodiment it will be understood that any device of the general class known as a thyristor can be used. This is also true for the embodiment of FIG. 4. The triac is a device which operates similar to a silicon controlled rectifier but which conducts current in both directions in response to a control pulse applied to the gate electrode thereof. A capacitor 64 is connected between the gate electrode of the triac and the line 44a to filter extraneous signals to prevent inadvertent conduction of the triac. When voltage at output terminals 18 and 20 is greater than the desired output voltage, the zener diode 58 will conduct which, in turn, renders transistor 57 conductive to reverse bias the gate electrode of the triac 62 and maintain it in an open circuit or nonconductive condition. However, when voltage across terminals 18 and 20 decreases below a predetermined voltage value, zener diode 58 becomes nonconductive and transistor 57 similarly becomes nonconductive. This allows the pulses applied to the triac to pass through the gate electrode thereof more freely and through capacitor 64 to render the triac conductive and perform its switching function and allow the reverse voltage pulses to be applied to the rotary transformer 32.

Figure 4:
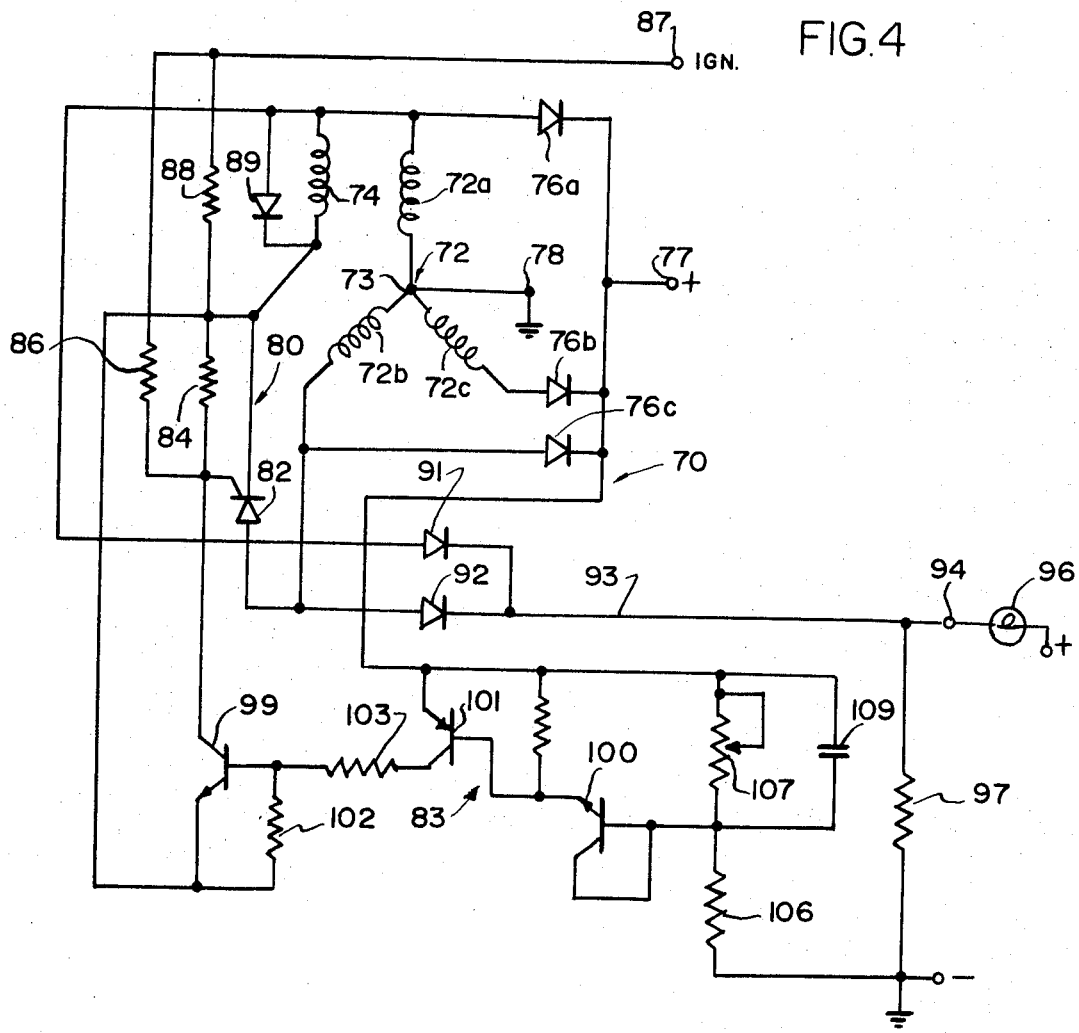
FIG. 4 is an alternate form of alternator and regulator control system constructed in accordance with this invention.

Referring now to FIG. 4 there is seen an alternate form of an alternator and regulator control system constructed in accordance with this invention, which is designated generally by reference numeral 70. The control system includes the output windings 72 of an alternator, shown here connected in WYE configuration with the center common terminal 73 thereof connected to ground potential. A field winding 74 of the alternator is located in close proximity to the output winding 72 to develop a magnetic field and induce alternating current voltage in the output windings. The output windings 72a, 72b and 72c are connected to output diodes 76a, 76b and 76c, respectively, to deliver half wave pulses of direct current to the positive output terminal 77. The output terminals 77 and 78 are of opposite polarity than that shown in FIG. 1, it being understood that mere reversal of connection of the diodes or other semiconductor components will change the polarity of the output voltage. When diodes 76a, 76b and 76c are rendered nonconductive, they produce a high voltage reverse voltage pulse in their associated winding which is then delivered to the field winding 74 through a feedback circuit 80. Here the feedback circuit 80 consists merely of a silicon controlled rectifier 82 which has its anode connected to the output windings 72 and its cathode connected to the field winding 74. The gate electrode of silicon controlled rectifier 84 is controlled by a voltage regulator circuit designated generally by 83. A voltage developing resistor 84 is connected between the gate and cathode of silicon controlled rectifier 82 and a turn on resistor 86 is connected to the gate of silicon controlled rectifier 82 and to an ignition terminal 87. Therefore, upon turning on the ignition switch of an automobile, the regulator system is placed in readiness for operation when the engine turns the alternator rotor. To provide a slight magnetic field for initial operation, the field winding 74 is connected to the ignition terminal 87 through a resistor 88 which is of relatively high resistance value, but which allows sufficient current flow through the field winding to produce a slight magnetic field to initiate start up of the charging system. The alternator field 74 is shunted by a diode 89 which serves to prevent recirculating currents from developing high voltages with the field winding.

The alternator and regulator circuit system of FIG. 4 operates in substantially the same manner as that disclosed with regard to FIG. 1 in that current through the field winding is developed as a result of the reverse voltage pulses developed in the output windings by rapid nonconduction of the output diodes 76a, 76b and 76c. These reverse voltage pulses may have a magnitude of about 4 times greater than that of the normal half wave pulses applied to the output terminal and thus provides a very efficient output voltage from the alternator system.

An indicating lamp 96 receives operating potential via a pair of diodes 91 and 92 connected to the output windings 72a and 72b, respectively. This applies two of the three output pulses to line 93 which, in turn, has the terminal 94 arranged for connection to the indicating lamp 96 which is located within the automobile. The indicating lamp 96 has the other end thereof connected to battery potential and, when the ignition switch is closed, no current passes through the diodes 91 and 92 and the lamp is energized from the battery voltage through a load resistor 97. However, when output voltage is obtained from the alternator, line 93 becomes positive to about the same voltage value as that of the battery and a no voltage condition exists across the indicating lamp 96 to extinguish it. Only the two diodes 91 and 92 are needed to de-energize the lamp 96 because of the increased voltage obtained from the stator windings 72a and 72b. Prior to the development of this invention three diodes were needed for this function.

The current control transistor 99 is connected to the gate electrode of silicon controlled rectifier 82 to control its operation. A transistor 100 is operated as a zener diode by having its collector electrode tied back to its base electrode and the base emitter junction connected in series with the base electrode of a transistor 101. Transistor 101 functions as a temperature compensating unit. Transistor 99 is then rendered operative to short circuit the gate cathode circuit of silicon controlled rectifier 82 to disable the rectifier. On the other hand, when bias voltage is removed from resistors 102 and 103, transistor 99 is rendered inoperative, which, in turn will cause conduction of silicon controlled rectifier 82 via its voltage dropping resistor 84. The voltage setting at the output terminals 77 and 78 can be adjusted by a variable voltage divider network comprising a resistor 106 and a potentiometer 107 which is connected to the transistor 100 which is connected to act as a zener diode. The potentiometer 107 is shunted by a filter capacitor 109 which eliminates extraneous signals from being applied through the zener diode.

Silicon controlled rectifier 82 operates with the same function as the triac 62 of FIG. 2, and the switch means 42 of FIG. 1. It allows the reverse voltage pulses to be applied to the field winding 74 only when in the conductive state and blocks such pulses when rendered nonconductive by the voltage regulator circuit 83.

Figure 5:
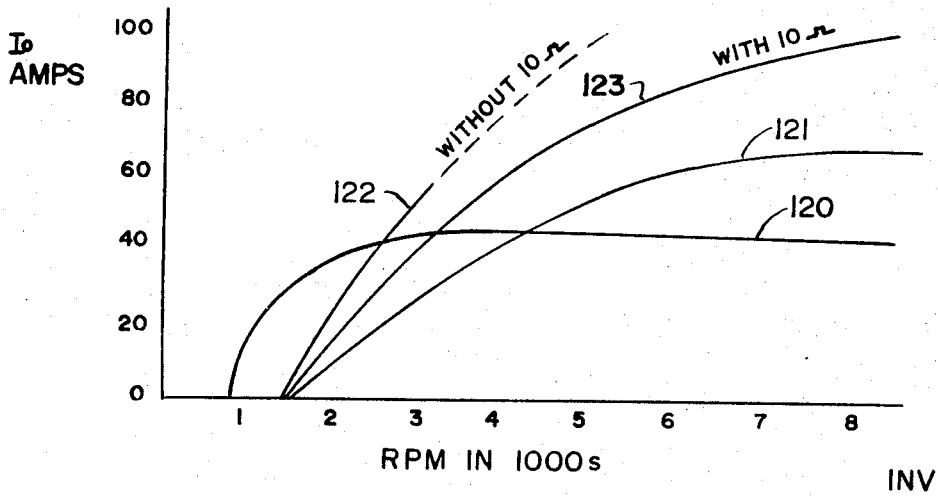
FIG. 5 illustrates the several power curves obtained both from full wave and half wave alternator outputs of conventional design and also shows the marked improvement of alternator output when using the high reverse voltage pulses in accordance with this invention.

For a better understanding of the improved power output obtained by this invention reference is now made to the graph shown in FIG. 5 which shows output amperes versus alternator rpm. Here the curve 120 shows the typical full wave output of a conventional alternator regulator arrangement. With the average usable range of alternator rpm between 3,000 and 8,000 rpm the output is substantially constant at about 40 amperes for this type of alternator. When a half wave output arrangement is used within low rpm range, it will produce a reduced power output, but at the higher rpm range the power output will be increased as shown by the curve 121. In both cases the field was fed an excitation voltage from the battery or charging system. When using the arrangement of the present invention on the very same alternator the output is so greatly increased that excessive amounts of current can be obtained, this being shown by the partial solid and partial broken line curve 122. To prevent damage to the alternator a 10 ohm resistor was inserted into the field line to limit the voltage applied thereto. The output power obtained with the 10 ohm resistor is shown by the curve 123 which reaches 100 amperes for a machine that previously reached only 40 amperes on full wave and 65 amperes on half wave.

What has been described is a simple and efficient alternator and regulator control system which utilizes the reverse voltage pulses generated in the output windings as a result of rapid nonconduction of the output diodes to produce a control current for the field winding of the alternator.

I claim:

1. An alternator and regulator control system comprising in combination, output windings for developing an alternating current output voltage having first and second polarities, a field winding positioned adjacent said output windings for developing a magnetic field to induce the alternating current output voltage into said output windings, rectifier means connected to said output voltage to rectify said alternating current output voltage, said rectifier means being highly conductive with said output voltage of the first polarity to pass unidirectional current and being highly nonconductive with said output voltage of the second polarity to block current, and the transition from conduction to nonconduction of said rectifier means producing a reverse voltage pulse in said output windings, and feedback means connected between said output windings and said field winding to utilize said reverse voltage pulses for energizing of said field winding.

2. The alternator and regulator control system of claim 1 wherein said feedback means includes a rotary transformer for receiving said reverse voltage pulses, said rotary transformer including a fixed primary winding for said reverse voltage pulses and a rotating secondary winding rotatable with said field winding, and a second rectifier means connected between said rotating secondary winding and said field winding to deliver direct current pulses to said field winding to produce a magnetic field therein.

3. The alternator and regulator control system of claim 2 wherein said second rectifier means is a bridge rectifier circuit.

4. The alternator and regulator control system of claim 1 wherein said feedback means includes a silicon controlled rectifier having load electrodes and a control electrode, said load electrodes connected between said output winding and said field winding for passing said reverse voltage pulses to produce a magnetic field within said field winding, and regulator means for controlling the gate electrode of said silicon controlled rectifier to render the same conductive and nonconductive in response to demands for output voltage from the said output windings.

5. The alternator and regulator control system of claim 4 wherein said silicon controlled rectifier has its anode connected to said output windings and its cathode connected to said field winding.

6. An alternator and regulator control system comprising in combination, a first winding means for developing an alternating current voltage output, a second winding means positioned adjacent said first winding means for developing a magnetic field to induce the alternating current output voltage into said first winding means, means connected to said first winding means to convert the alternating current output voltage to a direct current voltage by passing current of one polarity and blocking current of the other polarity such that the transition from a current passing condition to a current blocking condition causing reverse voltage pulses to be developed in said first winding means, feedback means for delivering said reverse voltage pulses from said first winding means to said second winding means to develop the magnetic field therein, and regulator circuit means having terminals connected to said means for converting said alternating current output voltage to said direct current voltage to sense the value thereof and produce a control signal, said regulator circuit means including switch means responsive to said control signal to switchably connect said reverse voltage pulses from said first winding means to said second winding means.

7. The alternator and regulator control system of claim 6 wherein said switch means of said regulator circuit means is a silicon controlled rectifier having the anode thereof connected to said means for converting said alternating current output voltage to said direct current voltage and the cathode thereof connected to said second winding means.

8. The alternator and regulator control system of claim 6 wherein said switch means is a triac which allows pulses of current to pass in both directions, and further including a rotary transformer having the fixed primary winding thereof connected in series with said triac to receive said reverse voltage pulses and a rotary secondary winding thereof connected to said second winding means through a bridge rectifier circuit.

9. The alternator and regulator control system of claim 6 further including a light indicating circuit consisting of a lamp having one terminal connected to a battery supply of the control system, and two diodes connected to said first winding means and the other terminal of said lamp to provide a counteracting voltage thereto and extinguish the lamp.

* * * * *